United States Patent [19]
Bekiarian

[11] Patent Number: 5,852,150
[45] Date of Patent: Dec. 22, 1998

[54] BASE RESISTANT FLUORINATED POLYMERS

[75] Inventor: Paul Gregory Bekiarian, Wilmington, Del.

[73] Assignee: E. I. du Pont de Nemours and Company, Wilmington, Del.

[21] Appl. No.: 973,382

[22] PCT Filed: Jun. 7, 1996

[86] PCT No.: PCT/US96/09754

§ 371 Date: Dec. 3, 1997

§ 102(e) Date: Dec. 3, 1997

[87] PCT Pub. No.: WO96/41823

PCT Pub. Date: Dec. 27, 1996

[51] Int. Cl.$^6$ ..................... C08F 16/24
[52] U.S. Cl. ............ 526/247; 526/206; 526/249
[58] Field of Search .................. 526/247, 206, 526/249

[56] References Cited

U.S. PATENT DOCUMENTS

| | | | |
|---|---|---|---|
| 2,917,548 | 12/1959 | Dixon | 260/614 |
| 3,159,609 | 12/1964 | Harris, Jr. et al. | 260/87.5 |
| 3,525,724 | 8/1970 | Squire et al. | 260/87.5 |
| 4,158,678 | 6/1979 | Tatemoto et al. | 260/884 |
| 4,243,770 | 1/1981 | Tatemoto et al. | 525/331 |
| 4,529,784 | 7/1985 | Finlay | 526/247 |
| 4,931,511 | 6/1990 | Kawachi et al. | 526/247 |
| 4,948,852 | 8/1990 | Moore | 526/247 |
| 4,973,633 | 11/1990 | Moore | 526/247 |
| 4,973,634 | 11/1990 | Logotletis | 526/247 |

FOREIGN PATENT DOCUMENTS

| | | | |
|---|---|---|---|
| 0224037 | 6/1987 | European Pat. Off. | 526/247 |
| 5759921 | 4/1982 | Japan | 526/247 |
| 1294760 | 11/1989 | Japan | 526/247 |
| 1116210 | 6/1968 | United Kingdom | 526/247 |

*Primary Examiner*—Jeffrey T. Smith
*Assistant Examiner*—N. Sarafim

[57] ABSTRACT

Disclosed herein are copolymers of tetrafluoroethylene and n-alkyl trifluorovinyl ether which further contain either curesite repeat units and/or iodine. Such curesite repeat units, upon exposure to free radicals, may crosslink the copolymers. The iodine is introduced by carrying out free radical polymerization in the presence of an organic iodide chain transfer agent. The polymers according to the invention are especially useful as elastomers and/or as molding resins for articles or parts that may be exposed to a basic environment. The preparation of such polymers by aqueous emulsion polymerization is also disclosed.

16 Claims, No Drawings

BASE RESISTANT FLUORINATED POLYMERS

FIELD OF THE INVENTION

Disclosed herein are polymers derived from tetrafluoroethylene, an alkyl trifluorovinyl ether, and a curesite monomer and/or an organic iodide compound. A process for preparing such polymers is also disclosed. Such polymers are especially useful as base resistant elastomers.

TECHNICAL BACKGROUND

Fluoropolymers are generally well known for their chemical and thermal resistance. Partially fluorinated polymers, however, usually have some weakness towards certain types of chemicals, particularly bases. Such polymers often undergo dehydrofluorination or other reactions in the presence of bases, making them unsuitable for use in basic environments. This is particularly true for partially fluorinated polymers which are elastomers, since they are often used as seals for systems which are basic. For this reason, partially fluorinated polymers which are relatively stable to bases have been sought.

U.S. Pat. No. 3,159,609 describes copolymers of tetrafluoroethylene (TFE) and alkyl trifluorovinyl ethers. These polymers are not described as being readily crosslinkable.

U.S. Pat. Nos. 4,158,678, 4,243,770, 4,948,852 and 4,973,633 describe the use of organic iodides as chain transfer agent in fluoromonomer polymerizations. None of these references teach the polymers of this invention.

U.S. Pat. No. 3,525,724 describes polymers containing repeat units derived from tetrafluoroethylene, alkyl trifluorovinyl ethers, and the repeat unit —CF$_2$C(O)—. Such polymers are not free radically crosslinkable, as defined herein.

SUMMARY OF THE INVENTION

This invention concerns a first polymer, which is not crosslinked, comprising the repeat units $$-CF_2-CF_2 \tag{I}$$

$$-CF_2-CF-, \tag{II}$$
$$\quad\quad\quad |$$
$$\quad\quad\quad OR^1$$

and a crosslink-functional repeat unit (III), which enables said polymer to readily crosslink upon exposure of said polymer to free radicals, wherein R$^1$ is an alkyl group containing 1 to 6 carbon atoms. Preferably, the molar ratio of (I):(II) is about 4:1 to about 1:1, and the molar ratio of [(I)+(II)]:(III) is about 200:1 to about 20:1. The repeat units (I)+(II)+(III) are, in combination, about 50 mole percent or more of the repeat units making up the polymer.

In the above formulas, the repeat unit (I) can be derived from the monomer tetrafluoroethylene (IV), and the repeat unit (II) can be derived from a monomer of the formula CF$_2$=CFOR$^3$ (V).

A novel process for preparing the above-described polymer is also disclosed, which process comprises reacting an admixture of monomers comprising at least 50 mole percent of a combination of tetrafluoroethylene, at least one monomer within the formula CF$_2$=CFOR$^1$, and at least one crosslink-functional comonomer, wherein the polymerization process is carried out in an aqueous emulsion at a temperature of from about 30° to 80° C. at a tetrafluoroethylene pressure of about 1 to 6 MPa.

The present invention also concerns a second polymer, which is not crosslinked, which is made by free radically copolymerizing, in the presence of an organic iodide, the following monomers: tetrafluoroethylene (IV), a compound of the formula CF$_2$=CFOR$^1$ (V), wherein R$^1$ is alkyl containing 1 to 6 carbon atoms, and, optionally, other free radically copolymerizable monomers, such that the polymer product contains about 0.1 to about 5 percent by weight of iodine. The monomers (IV) and (V) react to form, respectively, repeat units (I) and (II), as defined above, which repeat units, in combination, are at least 50 mole percent of the repeat units making up the polymer product.

DETAILS OF THE INVENTION

The present invention includes two kinds of copolymers which which are useful as base resistant elastomers and which contain a repeat unit derived from a trifluorovinyl ether monomer. The first polymer described herein has three necessary repeat units, herein labelled (I), (II) and (III). Unit (I) is derived from tetrafluoroethylene (TEE), while repeat unit (II) is derived from a trifluorovinyl ether monomer of the formula CF$_2$=CFOR$^1$ (V). The monomer from which repeat unit (II) is derived may be made by the method described in U.S. Pat. No. 2,917,548. In a preferred embodiment, R$^1$ in (II) and (V) are ethyl, n-propyl or n-butyl, more preferably n-butyl.

If a polymer consisted only of repeat units (I) and (II), it could only be free radically crosslinked with relative difficulty. Repeat unit (III) enables the polymer to be readily crosslinked when exposed to free radicals (or sources of energy that create free radicals). The ability to readily form crosslinks at a sufficiently high level or concentration is important for elastomeric polymers, in order to provide good vulcanizate properties.

In a preferred embodiment of the first kind of polymer according to the present invention, the polymer is an elastomer, i.e., a copolymer that is above its glass transition temperature and contains no appreciable amount of crystallinity at 20° C., as measured by differential scanning calorimetry.

Repeat units and monomers which readily enable crosslinking of fluoropolymers under free radical conditions are well known. See, for instance, U.S. Pat. Nos. 4,035,565, 4,564,662, 4,745,165, 4,694,045, 4,948,852, 4,973,633 and 5,173,553.

Crosslink-functional monomers which are adapted to provide a reactive curesite for the polymer, include those that contain bromine in a side chain. Suitable bromine-containing curesite monomers include bromotetrafluorobutene, bromotrifluoroethylene, and brominated fluorovinyl ethers such as CF$_2$=CFOCF$_2$CF$_2$Br and CF$_3$CH$_2$OCF=CFBr.

Free-radical crosslinking sites may also be found on repeat units which contain alkyl groups having at least 1 methine hydrogen atom (a hydrogen atom bound to a carbon atom which in turn is bound to three other carbon atoms) in a side chain, or which contain an alkyl ether group in a side chain, wherein the alkyl is substituted or unsubstituted. More than one repeat unit (III) that promotes free radical crosslinking of the polymer may be present.

Preferred repeat units (III) are as follows:

$$-CH_2-CH- \tag{IIIA}$$
$$\quad\quad\quad |$$
$$\quad\quad (CF_2)_iBr$$

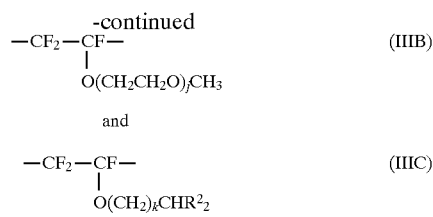

wherein i and k is an integer in the range of 2 to 10, preferably 2 or 4, j is an integer in the range of 1 to 4, preferably 1, and each $R^2$ is independently an alkyl group containing 1 to 4 carbons. It is preferred if both $R^2$ groups are methyl. The monomers for preferred repeat unit (IIIA) can be made by methods described in P. Tarrant, et al., *J. Org. Chem.*, vol. 34, p. 864ff (1969). The monomers which polymerize to form the above repeat units (IIIB) and (IIIC) can be made by the reaction of an alkoxide of the corresponding alcohol with tetrafluoroethylene, as will be readily appreciated by the skilled artisan.

Preferably, in the above-described polymers, the molar ratio of (I):(II) is about 3:1 to about 13:7, and/or the molar ratio of [(I)+(II)]:(III) is about 130:1 to about 70:1.

In the first polymer according to the present invention, up to 50 mole percent of the repeat units may be units other than (I), (II), and (III). These other units may be derived from a wide variety of known monomers which free radically copolymerize with the monomers from which repeat units (I), (II) and (III) are derived. For examples of such known monomers, see, for instance, W. Gerhartz, et al., Ed., Ullmann's Encyclopedia of Industrial Chemistry, vol. A11, at p. 393–429 (VCH Verlagsgesellschaft mbH, Weinheim 5th Ed. 1988); and H. F. Mark, et al., Ed., Encyclopedia of Polymer Science and Technology, at p. 577–648 (John Wiley & Sons, New York 3d Ed. 1989). Accordingly, suitable optional comonomers include vinylidene fluoride, hexafluoropropylene, perfluoro(alkyl vinyl ether), preferably wherein the alkyl group contains 1 to 5 carbon atoms, especially perfluoro(methyl vinyl ether). Preferably, the optional repeat units are present in the first polymer in an amount of less than 35 mole percent of the repeat units of the first polymer. More preferably, the first polymer consists essentially of repeat units (I), (II) and (III).

The first polymers according to the present invention may be prepared by free radical polymerization using methods known to the skilled artisan. See, for instance, W. Gerhartz, et al., Ed., Ullmann's Encyclopedia of Industrial Chemistry, vol. A11, at p. 393–429 (VCH Verlagsgesellschaft mbH, Weinheim, 5th Ed. 1988); and H. F. Mark, et al., Ed., Encyclopedia of Polymer science and Technology, at 577–648 (John Wiley & Sons, New York 3d Ed. 1989). These polymers may be made by batch, semi-batch or continuous processes, employing solution, aqueous, non-aqueous suspension, or emulsion polymerization processes. Such polymers should preferably be of sufficient molecular weight so that a useful crosslinkable elastomer can be formed, although lower molecular weights may also be useful, for example, as crosslinkable caulks.

Preferably, the the first or second polymers according to the present invention is made by an aqueous emulsion polymerization carried out at about 30° to 80° C., preferably about 35° to 45° C., and most preferably about 40°±5° C. in a semi-batch or continuous mode, at a TFE pressure of about 1–6 MPa, preferably 1–3 MPa. Such a polymerization is illustrated by Example 12 herein.

The first polymers according to the present invention may be in a crosslinked or uncrosslinked form. These polymers may be crosslinked by mixing them with a suitable amount of at least one free radical generator, typically about 1 to about 10 weight percent of the generator in the reaction mixture, and heating to generate free radicals and hence crosslink. As the artisan will readily understand, free radicals should be generated which are of sufficiently high energy to cause crosslinking. Suitable free radical generators include 2,5-dimethyl-2,5-bis(t-butylperoxy)hexane (available as Lupersol®/Luperco® 101XL from Atochem, Inc.), 2,5-dimethyl-2,5-bis-t-butylperoxy)hex-3-yne (available as Lupersol®/Luperco® 13OXL from Atochem, Inc.), di-t-butyl peroxide, and dicumyl peroxide. Suitable coagents, such as triallyl isocyanurate or trimethallyl isocyanurate, may also be used to improve the efficiency of crosslinking by the radical generator.

The second polymer of the present invention is a polymer which is made by free radical polymerization of TFE (IV) and $CF_2=CFOR^1$ (V), wherein $R^1$ is an alkyl group containing 1 to 6 carbon atoms. In this case, $R^1$ preferably contains 2 to 4 carbon atoms. It is also preferred that $R^1$ is n-alkyl. It is especially preferred that $R^1$ is n butyl. The polymerization to make the second polymer is carried out by essentially the same methods employed to prepare the first polymer disclosed herein (see above), except that an organic iodide must be present and the monomer for making repeat unit (III) may not necessarily be present.

The organic iodide acts as a chain transfer agent, thereby resulting in iodine atoms becoming part of the product polymer. The product polymer contains about 0.1 to about 5 weight percent of iodine, preferably about 0.5 to about 2.5 weight percent of iodine. For listings of such iodides, and how such iodides are used, see U.S. Pat. Nos. 4,158,678, 4,243,770, 4,948,852 and 4,973,633. Preferred iodides are $R^4I$, wherein $R^4$ is perfluoroalkyl, $CH_2I_2$, and $I(CH_2CH_2)_p(CF_2)_m(CH_2CH_2)_pI$, wherein m is 1–10, preferably 2, and each p is independently 0 or 1, preferably 0.

The weight percent of iodine in the polymer may be measured as described in Analytical Chemistry, vol. 22, p. 1047ff (1950). The iodine analyses reported herein were done by Schwartzkopf Microanalytical Laboratories using this method.

The second polymer according to the present invention is preferably elastomeric. This second polymer may optionally contain up to 50 mole percent of repeat units derived from monomers other than TFE (IV) and $CF_2=CFOR^3$ (V). The optional and preferred monomers listed above for the first polymer are also optional and preferred for the second polymer. In addition, any of the repeat units (III) mentioned above may be present in the second polymer (as part of the optional repeat units). The preferred repeat units (III) mentioned above are also the preferred optional repeat units in the second polymer.

The second polymer herein may be crosslinked or uncrosslinked. The polymer may be free radically crosslinked by methods described above for the first polymer.

Polymers according to the present invention, of both the first and second kind described herein, are useful as elastomers and molding resins for making parts which require heat and chemical, especially base, resistance. When used as thermoplastic molding resins, the polymers may be crosslinked during molding by incorporating a free radical generating agent that decomposes at the molding temperatures. If the polymer is elastomeric, however, it is preferably crosslinked during, for example, molding or extrusion, as is done with most elastomers. The resulting parts are useful, for example, in gaskets and seals, including o-rings, especially where chemical and temperature resistance, particularly base resistance, is required. These polymers are especially useful when used in contact with certain basic fluids, such as monoamines and polyamines.

Except where noted, all pressures in the following Examples are gauge pressures. The following abbreviations are used in the Examples:

| | |
|---|---|
| BTFB | 4-bromo-3,3,4,4-tetrafluorobut-1-ene |
| BuFVE | n-butyl trifluorovinyl ether |
| DSC | Differential Scanning Calorimetry |
| TFE | tetrafluoroethylene |
| $T_g$ | glass transition temperature |
| TGA | ThermoGravimetric Analysis |

EXAMPLE 1

This example illustrates the copolymerization of $CF_2=CF_2$, $CF_2=CF-O-C_4H_9$ and $CH_2=CHCF_2CF_2Br$ in a 30:10:1 mole ratio in organic media. A 75 ml pressure vessel was charged with 7.7 g of $CF_2=CF-O-C_4H_9$, 1.04 g of $CH_2=CHCF_2CF_2Br$, 0.2 g bis(t-butylcyclohexyl) peroxydicarbonate and 40 g of 1,1,2-trichlorotrifluoroethane. The vessel was sealed, cooled in dry ice, evacuated and charged with about 15 g of $CF_2=CF_2$. The vessel was then heated to 60° C. for 12 hr with agitation. The internal pressure reached a maximum of about 1.89 MPa and fell to less than 345 kPa after 5.6 hr. The vessel was cooled to 25° C. and vented to atmospheric pressure. A hazy fluid polymer solution was discharged. The volatile components were evaporated under a heat lamp and then in a vacuum oven at 100° C. to yield 22 g of a clear polymer which could be pressed at 80° C. into a clear, flexible, tough film. DSC analysis showed a $T_g$ at -19.1° C. on the second heat and no crystalline melting point. TGA analysis showed a 10% weight loss at 316.7° C. in air and at 363.0° C. in nitrogen. The polymer was shown to contain 76.5 mole % $CF_2=CF_2$ and 23.5 mole % $CF_2=CF-O-C_4H_9$ by integration of the appropriate resonances in the $^{19}F$ nmr measured in tetrachloroethane at 140° C. Elemental analysis found the following: C, 30.93 wt %; H, 2.03 wt %; F, 60.72 wt %; Br, 1.61 wt %, from which the composition 73.1 mole % $CF_2=CF_2$, 25.7 mole % $CF_2=CF-O-C_4H_9$ and 1.1 mole % $CH_2=CHCF_2CF_2Br$ was calculated.

EXAMPLE 2

This example illustrates the copolymerization of $CF_2=CF_2$, $CF_2=CF-O-C_4H_9$ and $CF_2=CF-O-CH_2CH_2OCH_3$ in a 30:10:1 mole ratio in organic media. A 75 ml pressure vessel was charged with 7.7 g of $CF_2=CF-O-C_4H_9$, 0.78 g of $CF_2=CF-O-CH_2CH_2OCH_3$, 0.2 g bis(t-butylcyclohexyl)peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 2.07 MPa and fell to less than 345 kPa after 7 hr. The vessel was cooled to 25° C. and vented to atmospheric pressure. A hazy fluid containing chunks of gelatinous material was discharged. The volatile components were evaporated under a heat lamp and then in a vacuum oven at 100° C. to yield 24.5 g of a clear polymer which could be pressed at 80° C. into a clear, flexible, tough film. DSC analysis showed a $T_g$ at -17.1° C. on the second heat and no crystalline melting point. TGA analysis showed a 10% weight loss at 321.5° C., in air, and at 380.2° C., in nitrogen. The polymer was shown to contain 75 mole % $CF_2=CF_2$ and 25 mole % combined $CF_2=CF-O-C_4H_9$ and $CF_2=CF-O-CH_2CH_2OCH_3$ by integration of the appropriate resonances in the $^{19}F$ nmr measured in tetrachloroethane at 140° C. The ratio of $CF_2=CF-O-C_4H_9$ to $CF_2=CF-O-CH_2CH_2OCH_3$ was shown to be 13.6 to 1 by integration of the $-CH_3$ resonance of $CF_2=CF-O-C_4H_9$ at δ, 0.98 and the $-CH_3$ resonance of $CF_2=CF-O-CH_2CH_2OCH_3$ at δ, 3.4 in the $^1H$ nmr measured in tetrachloroethane at 130° C.

EXAMPLE 3

This example illustrates the copolymerization of $CF_2=CF_2$, $CF_2=CF-O-C_4H_9$ and $CF_2=CF-O-CH_2CH(CH_3)_2$ in a 30:10:1 mole ratio in organic media. A 75 ml pressure vessel was charged with 7.7 g of $CF_2=CF-O-C_4H_9$, 0.77 g of $CF_2=CF-O-CH_2CH(CH_3)_2$, 0.2 g bis(t-butylcyclohexyl)peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 2.07 MPa and fell to less than 345 kPa after 6 hr. The vessel was cooled to 25° C. and vented to atmospheric pressure. A hazy fluid containing chunks of gelatinous material was discharged. The volatile components were evaporated under a heat lamp and then in a vacuum oven at 100° C. to yield 23.5 g of a clear polymer which could be pressed at 100° C. into a clear, flexible, tough film. DSC analysis showed a $T_g$ at -20.7° C. on the second heat and no crystalline melting point. TGA analysis showed a 10% weight loss at 326.4° C. in air and at 378.8° C. in nitrogen. The polymer was shown to contain 75 mole % $CF_2=CF_2$ and 25 mole % combined $CF_2=CF-O-C_4H_9$ and $CF_2=CF-O-CH_2CH(CH_3)_2$ by integration of the appropriate resonances in the $^{19}F$ nmr measured in tetrachloroethane at 150° C. The ratio of $CF_2=CF-O-C_4H_9$ to $CF_2=CF-O-CH_2CH(CH_3)_2$ was shown to be 10 to 1 by integration of the $-OCH_2-$ resonance of $CF_2=CF-O-C_4H_9$ at δ, 4.06 and the $-OCH_2-$ resonance of $CF_2=CF-O-CH_2CH(CH_3)_2$ at δ, 3.85 in the $^1H$ nmr measured in tetrachloroethane at 130° C.

EXAMPLE 4

This example illustrates the copolymerization of $CF_2=CF_2$, $CF_2=CF-O-C_4H_9$ and $CF_2=CF-O-(CH_2)_2CH(CH_3)_2$ in a 30:10:1 mole ratio in organic media. A 75 ml pressure vessel was charged with 7.7 g of $CF_2=CF-O-C_4H_9$, 0.84 g of $CF_2=CF-O-(CH_2)_2CH(CH_3)_2$, 0.2 g bis (t-butylcyclohexyl)peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 1.86 MPa and fell to less than 482 kPa after 12 hr. The vessel was cooled to 25° C. and vented to atmospheric pressure. A hazy fluid of low viscosity was discharged. The volatile components were evaporated under a heat lamp and then in a vacuum oven at 100° C. to yield 20.3 g of clear polymer which could be pressed at 80° C. into a clear, flexible film. DSC analysis showed a $T_g$ at -17.4° C. on the second heat and no crystalline melting point. TGA analysis showed a 10% weight loss at 307.1° C. in air and at 351.6° C. in nitrogen. The polymer was shown to contain 73 mole % $CF_2=CF_2$ and 27 mole % combined $CF_2=CF-O-C_4H_9$ and $CF_2=CF-O-(CH_2)_2CH(CH_3)_2$ by integration of the appropriate resonances in the $^{19}F$ nmr measured in tetrachloroethane at 150° C. The ratio of $CF_2=CF-O-C_4H_9$ to $CF_2=CF-O-(CH_2)_2CH(CH_3)_2$ was shown to be 8.6 to 1 by integration of the $-OCH_2-$ resonance of $CF_2=CF-$ O—$C_4H_9$ at δ, 4.06 and the combined —$CH_3$ resonances of $CF_2=CF$—O—$C_4H_9$ and $CF_2=CF$—O—$(CH_2)_2CH(CH_3)_2$ at δ, 0.98 in the $^1H$ nmr measured in tetrachloroethane at 130° C.

EXAMPLE 5

This example illustrates the copolymerization of $CF_2=CF_2$, $CF_2=CF$—O—$C_4H_9$ and I—$CF_2CF_2$—I in a 30:10:1 mole ratio in organic media. A 75 ml pressure vessel was charged with 7.7 g of $CF_2=CF$—O—$C_4H_9$, 1.8 g of I—$CF_2CF_2$—I, 0.2 g bis(t-butylcyclohexyl) peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 2.07 MPa and fell to less than 345 kPa after 10 hr. The vessel was cooled to 25° C. and vented to atmospheric pressure. A clear polymer solution of low viscosity was discharged. The volatile components were evaporated under a heat lamp and then in a vacuum oven at 100° C. to yield 24.9 g of a clear polymer which could be pressed at 60° C. into a clear, flexible film. DSC analysis showed a $T_g$ at −29° C. on the second heat and no crystalline melting point. TGA analysis showed a 10% weight loss at about 320° C. in air and at about 350° C. in nitrogen. The polymer was shown to contain 79 mole % $CF_2=CF_2$ and 21 mole % $CF_2=CF$—O—$C_4H_9$ by integration of the appropriate resonances in the $^{19}F$ nmr measured in tetrachloroethane at 140° C. Elemental analysis found: C 29.39 wt %; H, 1.90 wt %; F, 60.75 wt %; I, 4.70 wt %.

EXAMPLE 6

This example illustrates the copolymerization of $CF_2=CF_2$, $CF_2=CF$—O—$C_4H_9$ and I—$(CF_2CF_2)_2$—I in a 30:10:1 mole ratio in organic media. A 75 ml pressure vessel was charged with 7.7 g of $CF_2=CF$—O—$C_4H_9$, 2.3 g of I—$(CF_2CF_2)_2$—I, 0.2 g bis(t-butylcyclohexyl) peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 1.89 MPa and fell to less than 345 kPa after 6 hr. The vessel was cooled to 25° C. and vented to atmospheric pressure. A clear polymer solution of low viscosity was discharged. The volatile components were evaporated under a heat lamp and then in a vacuum oven at 100° C. to yield 23.7 g of a clear polymer which could be pressed at 60° C. into a slightly pink, flexible film. DSC analysis showed a $T_g$ at −25.9° C. on the second heat and no crystalline melting point. TGA analysis showed a 10% weight loss at about 299.5° C. in air and at about 328.1° C. in nitrogen. The polymer was shown to contain 78 mole % $CF_2=CF_2$ and 22 mole % $CF_2=CF$—O—$C_4H_9$ by integration of the appropriate resonances in the $^{19}F$ nmr measured in tetrachloroethane at 140° C. Elemental analysis found: C, 29.46 wt %; H, 1.90 wt %; F, 60.64 wt %; I, 4.65 wt %.

EXAMPLE 7

This example illustrates the copolymerization of $CF_2=CF_2$, $CF_2=CF$—O—$C_4H_9$ and I—$CH_2$—I in a 75:25:1 mole ratio in organic media. A 75 ml pressure vessel was charged with 7.7 g of $CF_2=CF$—O—$C_4H_9$, 0.54 g of I—$CH_2$—I, 0.2 g bis(t-butylcyclohexyl)peroxydicarbonate and 40 g of 1,1,2-trichlorotrifluoroethane. The vessel was sealed, cooled in dry ice, evacuated and charged with about 15 g $CF_2=CF_2$. The vessel was heated to 60° C. for 12 hr with agitation. The internal pressure reached a maximum of about 2.00 MPa and fell to less than 345 kPa after 8 hr. The vessel was cooled to 25° C. and vented to atmospheric pressure. A hazy polymer solution of low viscosity was discharged. The volatile components were evaporated under a heat lamp and then in a vacuum oven at 100° C. to yield 24.2 g of a clear polymer which could be pressed at 80° C. into a clear, tough, flexible film. DSC analysis showed a $T_g$ at −26.9° C. on the second heat and no crystalline melting point. TGA analysis showed a 10% weight loss at about 325° C. in air and at about 370° C. in nitrogen. The polymer was shown to contain 77 mole % $CF_2=CF_2$ and 23 mole % $CF_2=CF$—O—$C_4H_9$ by integration of the appropriate resonances in the $^{19}F$ nmr measured in tetrachloroethane at 140° C. Elemental analysis found: C, 30.0 wt %; H, 1.86 wt %; F, 60.56 wt %; I, 0.96 wt %.

EXAMPLE 8

This example illustrates crosslinking polymers by action of an organic peroxide and radical trapping agent. Solutions of the polymers made in Examples 1–7 were prepared by dissolving 1 g of polymer, 0.03 g of Lupersol®-101 and 0.03 g of Diak®-7 (triallyl isocyanurate) in 5 ml of hexafluorobenzene. The solutions were transferred to 10 ml glass pressure vessels. The vessels were cooled in liquid nitrogen, evacuated and sealed. The reaction mixtures were defrosted and swirled until all components were completely dissolved. The solutions were completely fluid and of low viscosity. The vessels were heated in an upright position to 170° C. for 16–17 hr at which time they were cooled to 25° C. in an upright position. Upon inspection, the reaction mixtures had all undergone crosslinking to polymer networks which turned the reaction mixtures from low-viscosity fluids to immobile gels.

EXAMPLE 9

This example illustrates the copolymerization of $CF_2=CF_2$, $CF_2=CF$—O—$C_4H_9$ and $CH_2=CHCF_2CF_2Br$ in a 75:25:0.55 mole ratio in aqueous media at 80° C. A 1940 ml horizontal stainless-steel autoclave equipped with a 4-bladed agitator was charged with 1100 ml deionized water and 16 g ammonium perfluorooctanoate. The autoclave was sealed, pressurized with nitrogen to 684 kPa and then vented to 0 kPa. This pressure/venting cycle was repeated two times. The autoclave was evacuated to 0 kPa (absolute) and then purged with $CF_2=CF_2$ (TFE) to 0 kPa. This evacuation/purge cycle was repeated two times. At 0 kPa of TFE in the autoclave, 2 ml $CF_2=CF$—O—$C_4H_9$ (BuFVE) and 2 ml $CH_2=CHCF_2CF_2Br$ (BTFB) were injected into the autoclave. The autoclave was agitated at 150 rpm and heated to 80° C. and then charged with an additional 72 g TFE, 5.8 ml BuFVE and 0.5 ml BTFB (a 95:5:0.5 mole ratio). The pressure reached a maximum of about 2.07 MPa. Solution A, containing 1 g ammonium persulfate and 1 ml concentrated ammonium hydroxide per 100 ml deionized water, was injected at 10 ml/min for 20 ml and then continuously at 1 ml/min. The polymerization initiated, a mixture of TFE, BuFVE and BTFB in a 75:25:0.55 mole ratio was fed to the autoclave at about the rate at which it was consumed, while maintaining about 2.07 MPa pressure in the autoclave. After the reaction had progressed for about 2.5 hr, the rate of injection of solution A was decreased to 0.75 ml/min. After the reaction had progressed for about 2.75 hr, the rate of injection of solution A was decreased to 0.5 ml/min. After the reaction had progressed for about 3 hr, the rate of injection of solution A was decreased to 0.25 ml/min. The reaction was continued until about 400 g of TFE and BuFVE were fed to the autoclave. The autoclave contents were cooled to ambient temperature, vented to 0 kPa and discharged as a polymer emulsion. The emulsion was poured into a rapidly stirred solution of 50 g magnesium sulfate in 6 l deionized water at 25° C. to precipitate the polymer. The polymer was filtered and washed six times with water at 25° C. and then dried at 80° C. under partial vacuum with a sweep of nitrogen to yield 367 g of a soft slightly tacky polymer which could be pressed into dense slabs at 90° C. DSC analysis showed a $T_g$ at −3.6° C. on the second heat and no crystalline melting point. Elemental analysis found the following: C, 30.71 wt %; H, 1.96 wt %; F, 63.15 wt %; Br, 1.04 wt % from which the composition 74.7 mole % $CF_2=CF_2$, 23.8 mole % $CF_2=CF-O-C_4H_9$ and 1.5 mole % $CH_2=CHCF_2CF_2Br$ was calculated.

EXAMPLE 10

This example illustrates the copolymerization of $CF_2=CF_2$, $CF_2=CF-O-C_4H_9$ and $CH_2=CHCF_2CF_2Br$ in a 70:30:0.67 mole ratio in aqueous media at 70° C. A 1940 ml horizontal stainless-steel autoclave equipped with a 4-bladed agitator was charged with 1000 ml deionized water, 0.5 g sodium sulfite and 16 g ammonium perfluorooctanoate. The autoclave was sealed, pressurized with nitrogen to 689 kPa and then vented to 0 Pa. This pressure/venting cycle was repeated two times. The autoclave was evacuated to 0 kPa (absolute) and then purged with $CF_2=CF_2$ (TFE) to 0 kPa. This evacuation/purge cycle was repeated two times. The autoclave was agitated at 150 rpm and heated to 70° C. and then charged with an additional 93 g TFE, 6.8 ml BuFVE and 0.62 ml BTFB (a 95:5:0.5 mole ratio). The pressure reached a maximum of about 2.07 MPa. Solution A, containing 2 g ammonium persulfate and 2 ml concentrated ammonium hydroxide per 100 ml deionized water, was injected at 3 ml/min for 15 ml. Concurrently, solution B, containing 2.2 g sodium sulfite per 100 ml deionized water, was injected at 3 ml/min for 15 ml. Solutions A and B were then each injected continuously at 0.5 ml/min. The polymerization initiated, a mixture of TFE, BuFVE and BTFB in a 70:30:0.67 mole ratio was fed to the autoclave at about the rate at which it was consumed maintaining about 2.07 MPa pressure in the autoclave. After the reaction had progressed for about 2 hr, the rates of injection of solutions A and B were each increased to 0.75 ml/min. After the reaction had progressed for about 3 hr, the rates of injection of solutions A and B were each increased to 1.0 ml/min. The reaction was continued until about 400 g of TFE and BuFVE were fed to the autoclave. The autoclave contents were cooled to ambient temperature, vented to 0 kPa and discharged as a polymer emulsion. The emulsion was poured into a rapidly stirred solution of 50 g magnesium sulfate in 10 l deionized water at less than 20° C. to precipitate the polymer. After stirring overnight, the polymer was filtered and washed five times with water at 25° C. and then dried at 100° C. under partial vacuum with a sweep of nitrogen to yield 365 g of a polymer which could be pressed into dense slabs at 120° C. DSC analysis showed a $T_g$ at −12.9° C. on the second heat and no crystalline melting point. Elemental analysis found the following: C, 31.21 wt %; H, 2.24 wt %; F, 61.22 wt %; Br, 0.4 wt %, from which the composition 71.4 mole % $CF_2=CF_2$, 28.0 mole % $CF_2=CF-O-C_4H_9$ and 0.6 mole % $CH_2=CHCF_2CF_2Br$ was calculated.

EXAMPLE 11

This example illustrates the copolymerization of $CF_2=CF_2$, $CF_2=CF-O-C_4H_9$ and $CH_2=CHCF_2CF_2Br$ in a 70:30:0.67 mole ratio in aqueous media at 35° C. A 3600 ml horizontal stainless-steel autoclave equipped with a 4-bladed agitator was charged with 2000 ml deionized water, 0.5 g sodium sulfite and 28 g ammonium perfluorooctanoate. The autoclave was sealed, pressurized with nitrogen to 689 kPa, and then vented to 0 kPa. This pressure/venting cycle was repeated two times. The autoclave was evacuated to 0 kPa (absolute) and then purged with $CF_2=CF_2$ (TFE) to 0 kPa. This evacuation/purge cycle was repeated two times. At 0 kPa of TFE in the autoclave, 0.5 ml $CF_2=CF-O-C_4H_9$ (BuFVE) and 0.5 ml $CH_2=CHCF_2CF_2Br$ (BTFB) were injected into the autoclave. The autoclave was agitated at 175 rpm and heated to 30° C. and then charged with an additional 207 g TFE, 15.2 ml BuFVE and 1.7 ml BTFB (a 95:5:0.6 mole ratio). The pressure reached a maximum of about 2.07 MPa. Solution A, containing 4 g ammonium persulfate and 4 ml concentrated ammonium hydroxide per 100 ml deionized water, was injected at 3 ml/min for 9 ml. Concurrently, solution B, containing 4.4 g sodium sulfite per 100 ml deionized water, was injected at 3 ml/min for 9 ml. Solutions A and B were then each injected continuously at 0.5 ml/min. After the reaction had progressed for about 1 hr, the autoclave temperature was increased to 35° C. The polymerization initiated, a mixture of TFE, BuFVE and BTFB in a 70:30:0.67 mole ratio was fed to the autoclave at about the rate at which it was consumed maintaining about 2.07 MPa pressure in the autoclave. The reaction was continued until about 400 g of TFE and BuFVE were fed to the autoclave. The autoclave contents were cooled to ambient temperature, vented to 0 kPa and discharged as a polymer emulsion. The emulsion was poured into a rapidly stirred solution of 75 g magnesium sulfate in 24 l deionized water at about 50° C. to precipitate the polymer. The polymer was filtered and washed four times with water at about 50° C., two times with deionized water at 25° C., and then dried at 100° C. under partial vacuum with a sweep of nitrogen to yield 484 g of a polymer which could be pressed into dense slabs at 125° C. DSC analysis showed a $T_g$ at −12.3° C. on the second heat and no crystalline melting point. Elemental analysis found the following: C, 31.15 wt %; H, 2.01 wt %; F, 63.62 wt %; Br, 0.40 wt %, from which the composition 75.0 mole % $CF_2=CF_2$, 24.5 mole % $CF_2=CF-O-C_4H_9$ and 0.6 mole % $CH_2=CHCF_2CF_2Br$ was calculated.

EXAMPLE 12

This example illustrates the copolymerization of $CF_2=CF_2$, $CF_2=CF-O-C_4H_9$ and $CH_2=CHCF_2CF_2Br$ in a 70:30:0.67 mole ratio in aqueous media at 40° C. A 3600 ml horizontal stainless-steel autoclave equipped with a 4-bladed agitator was charged with 2000 ml deionized water, 0.5 g sodium sulfite and 28 g ammonium perfluorooctanoate. The autoclave was sealed, pressurized with nitrogen to 689 kPa and then vented to 0 kPa. This pressure/venting cycle was repeated two times. The autoclave was evacuated to 0 kPa (absolute) then purged with $CF_2=CF_2$ (TFE) to 0 kPa. This evacuation/purge cycle was repeated two times. At 0 kPa of TFE in the autoclave, 0.5 ml $CF_2=CF-O-C_4H_9$ (BuFVE) and 0.5 ml $CH_2=CHCF_2CF_2Br$ (BTFB) were injected into the autoclave. The autoclave was agitated at 175 rpm and heated to 40° C. and then charged with an additional 192 g TFE, 14.1 ml BuFVE and 1.6 ml BTFB (a 95:5:0.6 mole ratio). The pressure reached a maximum of about 2.07 MPa. Solution A, containing 4 g ammonium persulfate and 4 ml concentrated ammonium hydroxide per 100 ml deionized water, was injected at 3 ml/min for 9 ml. Concurrently, solution B, containing 4.4 g sodium sulfite per 100 ml deionized water, was injected at 3 ml/min for 9 ml. Solutions A and B were then each injected continuously at 0.5 ml/min. The polymerization initiated, a mixture of TFE, BuFVE and BTFB in a 70:30:0.67 mole ratio was fed to the autoclave at about the rate at which it was consumed maintaining about 2.07 MPa pressure in the autoclave. The reaction was continued until about 404 g of TFE and BuFVE were fed to the autoclave. The autoclave contents were cooled to ambient temperature, vented to 0 kPa and discharged as a polymer emulsion. The emulsion was poured into a rapidly stirred solution of 75 g magnesium sulfate in 12 l deionized water at about 50° C. to precipitate the polymer. The polymer was filtered and washed five times with water at about 50° C. and then dried at 100° C. under partial vacuum with a sweep of nitrogen to yield 422 g of a polymer which could be pressed into dense slabs at 120° C. DSC analysis showed a $T_g$ at −11.1° C. on the second heat and no crystalline melting point. Elemental analysis found the following: C, 31.62 wt %; H, 2.16 wt %; F, 60.69 wt %; Br, 0.41 wt %, from which the composition 72.0 mole % $CF_2=CF_2$, 27.4 mole % $CF_2=CF-O-C_4H_9$ and 0.60 mole % $CH_2=CHCF_2CF_2Br$ was calculated.

EXAMPLE 13

This example illustrates the base resistance of polymers prepared according to the present invention. Clear solutions of the polymers prepared in Examples 1–7 and 12 were prepared by dissolving 0.5 g of polymer in 5 ml hexafluorobenzene. For comparison, a solution of a fluoropolymer comprised of hexafluoropropylene and vinylidine fluoride (Viton® E60, available from E. I. du Pont de Nemours and Company, Inc., Wilmington, Del., U.S.A.) was prepared by dissolving 0.5 g of polymer in 5 ml methyl-ethyl ketone. At ambient temperature 1 drop of 1,8-diazabicyclo[5.4.0] undec-7-ene (DBU) was added to each solution and shaken vigorously for 30 seconds. After treatment with DBU, the solutions of the polymers of this invention flowed and remained clear or discolored only slightly to light yellow. In contrast, after treatment with DBU, the solution of Viton® E60 turned an opaque dark amber and gelled to an immobile state. These results demonstrate the excellent base-resistance of the polymers of this invention. The results for the polymers corresponding to the following examples are tabulated below.

Example 1—light-yellow, fluid solution; no viscosity increase
Example 2—light-yellow, fluid solution; no viscosity increase
Example 3—clear, fluid solution; no viscosity increase
Example 4—clear, fluid solution; no viscosity increase
Example 5—light-yellow, fluid solution; no viscosity increase
Example 6—clear, fluid solution; no viscosity increase
Example 7—clear, fluid solution; no viscosity increase
Example 12—light-yellow, fluid solution; no viscosity increase
Viton® E60—opaque dark amber solution; immobile gel

What is claimed is:

1. A polymer comprising the following repeat units:

$$-CF_2-CF_2 \quad (I)$$

$$-CF_2-CF-, \quad (II)$$
$$\quad | \quad$$
$$\quad OR^1 \quad$$

and (III), a repeat unit that is crosslinkable by exposure to free radicals, wherein (III) is selected from the four member group (a)–(d) consisting of (a) a repeat unit having a pendant alkyl group having at least one methine hydrogen atom, $$-CH_2-CH-, \quad (b)$$
$$\quad | \quad$$
$$\quad (CF_2)_iBr \quad$$

(IIIA)

$$-CF_2-CF- \quad (c)$$
$$\quad | \quad$$
$$\quad O(CH_2CH_2O)_jCH_3 \quad$$

(IIIB)

and $$-CF_2-CF- \quad (d)$$
$$\quad | \quad$$
$$\quad O(CH_2)_kCHR^2_2 \quad$$

(IIIC)

wherein i and k is an integer in the range of 2 to 10, j is an integer in the range of 1 to 4, and each $R^2$ is independently an alkyl group containing 1 to 4 carbon atoms;
by means of which the polymer is readily crosslinked upon exposure of said polymer to free radicals;
wherein $R^1$ is an alkyl containing 1 to 6 carbon atoms;
provided that (I)+(II)+(III) are at least about 50 mole percent of the repeat units in said polymer.

2. The polymer as recited in claim 1 wherein the molar ratio of (I):(II) is about 4:1 to about 1:1, and the molar ratio of [(I)+(II)]:(III) is about 200:1 to about 20:1.

3. The polymer as recited in claim 1 wherein i and k are 2 or 4, j is 1, and both $R^2$ groups are methyl.

4. The polymer as recited in claim 2 wherein the molar ratio of (I):(II) is about 3:1 to about 13:7.

5. The polymer as recited in claim 2 wherein the molar ratio of [(I)+(II)]:(III) is about 130:1 to about 70:1.

6. The polymer as recited in claim 2 wherein (I), (II), and (III) are, in combination, at least about 65 mole percent of said polymer.

7. The polymer as recited in claim 2 which consists essentially of repeat units (I), (II) and (III).

8. The polymer as recited in claim 2 which further contains one or more comonomers selected from the group consisting of vinylidene fluoride, hexafluoropropylene, and a perfluoro(alkyl vinyl ether), wherein the alkyl group contains 1 to 5 carbon atoms.

9. The polymer as recited in claim 1 which is an elastomer.

10. The polymer as recited in claim 2 which is crosslinked.

11. The polymer as recited in claim 2 wherein $R^1$ is ethyl, n-propyl or n-butyl.

12. The polymer as recited in claim 10 wherein $R^1$ is n-butyl.

13. A free radical polymerization process for preparing a fluoropolymer, which is not crosslinked, which process comprises reacting an admixture of monomers comprising at least 50 mole percent of a combination of (1) tetrafluoroethylene, (2) at least one monomer within the formula $CF_2=CFOR^1$, wherein $R^1$ is an alkyl containing 1 to 6 carbon atoms, and (3) at least one crosslink-functional comonomer of which the corresponding repeat unit enables the product polymer to readily crosslink upon exposure of said fluoropolymer to free radicals; wherein the polymerization process is carried out in an aqueous emulsion at a temperature of from about 30° to 80° C. at a tetrafluoroethylene pressure of about 1 to 6 MPa.

14. The polymerization process of claim 13, wherein the molar ratio of tetrafluoroethylene to $CF_2=CFOR^1$ in the product polymer is about 4:1 to about 1:1 and the molar ratio of tetrafluoroethylene plus $CF_2=CFOR^1$ to crosslink-functional monomer is about 200:1 to about 20:1.

15. The polymerization process of claim 13, wherein the cross-link functional comonomer is selected from the group consisting of $$-CH_2-CH- \atop | \atop (CF_2)_iBr \quad \text{(IIIA)}$$

$$-CF_2-CF- \atop | \atop O(CH_2CH_2O)_jCH_3 \quad \text{(IIIB)}$$

-continued
and $$-CF_2-CF- \atop | \atop O(CH_2)_kCHR^2_2 \quad \text{(IIIC)}$$

wherein i and k is an integer in the range of 2 to 10, j is an integer in the range of 1 to 4, and each $R^2$ is independently an alkyl group containing 1 to 4 carbon atoms.

16. The polymerization process of claim 15, wherein said temperature is about 35° to 45° C.

* * * * *